US012574614B2

(12) United States Patent
Zhang

(10) Patent No.: US 12,574,614 B2
(45) Date of Patent: Mar. 10, 2026

(54) METHOD, APPARATUS, DEVICE, MEDIUM AND PROGRAM PRODUCT FOR OBTAINING TEXT MATERIAL

(71) Applicant: Beijing Youzhuju Network Technology Co., Ltd., Beijing (CN)

(72) Inventor: Hongyang Zhang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/543,956

(22) Filed: Dec. 18, 2023

(65) Prior Publication Data

US 2024/0121485 A1     Apr. 11, 2024

Related U.S. Application Data

(63) Continuation of application No. PCT/CN2023/120815, filed on Sep. 22, 2023.

(30) Foreign Application Priority Data

Sep. 22, 2022    (CN) .......................... 202211159182.8

(51) Int. Cl.
*H04N 21/84* (2011.01)
*H04N 21/442* (2011.01)
*H04N 21/482* (2011.01)

(52) U.S. Cl.
CPC ....... *H04N 21/84* (2013.01); *H04N 21/44204* (2013.01); *H04N 21/4826* (2013.01)

(58) Field of Classification Search
None
See application file for complete search history.

(56) References Cited

U.S. PATENT DOCUMENTS

2009/0234878 A1* 9/2009 Herz .................... H04N 21/252
                                                           707/999.102
2011/0255845 A1   10/2011 Kikuchi
                              (Continued)

FOREIGN PATENT DOCUMENTS

CN          110858914 A      3/2020
CN          112287173 A      1/2021
                 (Continued)

OTHER PUBLICATIONS

International Search Report in PCT/CN2023/120815, mailed Dec. 21, 2023, 3 pages.

(Continued)

*Primary Examiner* — Benjamin R Bruckart
*Assistant Examiner* — Charles N Hicks
(74) *Attorney, Agent, or Firm* — Astute IP Law Group

(57)          ABSTRACT

Embodiments of the present disclosure relate to a method, apparatus, device, storage medium, and program product for obtaining text material, comprising: in response to a material obtaining instruction, obtaining a set of candidate videos associated with a target object comprising a plurality of posted candidate videos; for each candidate video, determining the popularity of the candidate video based on the playing data of the candidate video and/or the object information of the explained object included in the candidate video; selecting recommended videos based on popularity for display; in response to a selection operation for the recommended video, generating text material corresponding to the target object based on key information in the recommended video. In this way, users can quickly review the recommended videos and obtain creative inspiration.

18 Claims, 4 Drawing Sheets

(56) References Cited

U.S. PATENT DOCUMENTS

| | | | |
|---|---|---|---|
| 2014/0109125 A1* | 4/2014 | Kim ..................... | H04N 21/482 |
| | | | 725/14 |
| 2016/0094875 A1* | 3/2016 | Peterson ............ | H04N 21/4312 |
| | | | 725/41 |
| 2018/0152763 A1 | 5/2018 | Barlaskar et al. | |
| 2020/0242296 A1* | 7/2020 | Shu ........................ | G06V 20/20 |
| 2021/0176534 A1* | 6/2021 | Unami .............. | H04N 21/4753 |
| 2021/0294847 A1* | 9/2021 | Yoon ................. | H04N 21/4826 |
| 2024/0040205 A1* | 2/2024 | Zhao ..................... | G06V 20/70 |

FOREIGN PATENT DOCUMENTS

| | | |
|---|---|---|
| CN | 112637629 A | 4/2021 |
| CN | 112785381 A | 5/2021 |
| CN | 114501064 A | 5/2022 |
| CN | 113901263 B | 8/2022 |
| JP | 2011097417 A | 5/2011 |
| JP | 2020036374 A | 3/2020 |
| JP | 2022119921 A | 8/2022 |

OTHER PUBLICATIONS

"How to use the VideoStudio 2022 speech-to-text function", Software enthusiasts, Available on the internet at: https://blog.csdn.net/Tilling231/article/details/123048679, 2022, 12 pages.

Office Action for Chinese Patent Application No. 202211159182.8, mailed on Jun. 13, 2025, 14 pages.

Office Action for Japanese Patent Application No. 2024-571836, mailed on Dec. 2, 2025, 12 pages.

* cited by examiner

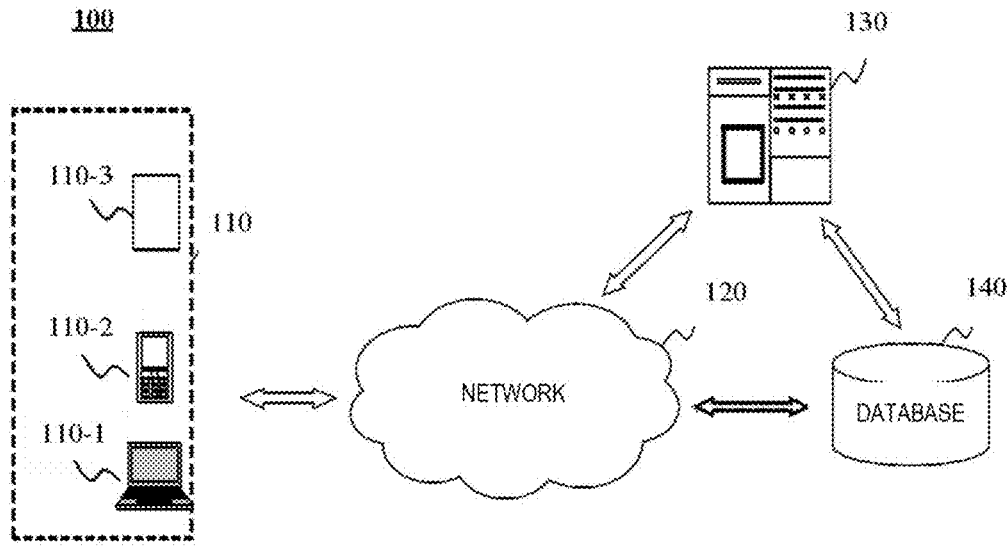

FIG. 1

IN RESPONSE TO A MATERIAL OBTAINING INSTRUCTION FOR A TARGET OBJECT, OBTAIN A SET OF CANDIDATE VIDEOS ASSOCIATED WITH THE TARGET OBJECT, THE SET OF CANDIDATE VIDEOS COMPRISING A PLURALITY OF POSTED CANDIDATE VIDEOS, THE CANDIDATE VIDEO BEING A VIDEO SEGMENT CONTAINING AN EXPLAINED OBJECT, THE EXPLAINED OBJECT BEING THE TARGET OBJECT OR BELONGING TO A SAME CATEGORY AS THE TARGET OBJECT ⟿ S101

FOR EACH OF THE CANDIDATE VIDEOS, DETERMINE A POPULARITY OF THE CANDIDATE VIDEO BASED ON PLAYING DATA OF THE CANDIDATE VIDEO AND/OR OBJECT INFORMATION OF THE EXPLAINED OBJECT CONTAINED IN THE CANDIDATE VIDEO ⟿ S102

SELECT, BASED ON THE POPULARITIES, A CANDIDATE VIDEO MEETING A PREDETERMINED REQUIREMENT AS A RECOMMENDED VIDEO AND DISPLAY THE RECOMMENDED VIDEO ⟿ S103

IN RESPONSE TO A SELECTION OPERATION FOR THE RECOMMENDED VIDEO, GENERATE A TEXT MATERIAL CORRESPONDING TO THE TARGET OBJECT BASED ON KEY INFORMATION IN THE RECOMMENDED VIDEO ⟿ S104

FIG. 2

METHOD, APPARATUS, DEVICE, MEDIUM AND PROGRAM PRODUCT FOR OBTAINING TEXT MATERIAL

The present application is a continuation of International Patent Application No. PCT/CN2023/120815, filed on Sep. 22, 2023, which claims priority to Chinese Patent Application No. 202211159182.8 filed on Sep. 22, 2022 and entitled "Method, Apparatus, Device, Medium and Program Product for obtaining text material", the content of which is incorporated herein by reference in its entirety.

FIELD

The present disclosure relates to the field of computer processing technology, and in particular, to a method, apparatus, device, storage medium, and program product for obtaining text material.

BACKGROUND

With the continuous development of Internet technology, short video technology has emerged and is increasingly favored by people. For example, people can publish short videos explaining the characteristics, advantages and disadvantages, and usage effects of an object in a short video application, so that users can more intuitively understand more object information through the video.

In order to improve the quality of short video recording, it is necessary to process and create relevant information about the object to obtain a high-quality text material, so that the short video can be more attractive to customers. Therefore, how to create a high-quality text material is a problem to be solved.

SUMMARY

In order to solve the above technical problems, the embodiments herein provides a method for obtaining text material, apparatus, apparatus, storage medium and program product, provides a high-quality video screening method, and acquires the target object from the screened high-quality video text material, so that users can quickly recommend high-quality video, creative inspiration.

In a first aspect, the embodiments herein provide a method for obtaining text material, comprising: in response to a material obtaining instruction for a target object, obtaining a set of candidate videos associated with the target object, the set of candidate videos comprising a plurality of posted candidate videos, the candidate video being a video segment containing an explained object, the explained object being the target object, or the explained object belonging to a same category as the target object; for each of the candidate videos, determining a popularity of the candidate video based on playing data of the candidate video and/or object information of the explained object contained in the candidate video; selecting, based on the popularities, a candidate video meeting a predetermined requirement as a recommended video and displaying the recommended video; and in response to a selection operation for the recommended video, generating a text material corresponding to the target object based on key information in the recommended video.

In a second aspect, the embodiments herein provide an apparatus for obtaining text material, comprising: a candidate video set obtaining module configured to, in response to a material obtaining instruction for a target object, obtain a set of candidate videos associated with the target object, the set of candidate videos comprising a plurality of posted candidate videos, the candidate video being a video segment containing an explained object, the explained object being the target object, or the explained object belonging to a same category as the target object; a popularity determination module configured to, for each of the candidate videos, determine a popularity of the candidate video based on playing data of the candidate video and/or object information of the explained object contained in the candidate video; a recommended video selection module configured to select, based on the popularity, a candidate video meeting a predetermined requirement as a recommended video and displaying the recommended video; and a text material generation module configured to, in response to a selection operation for the recommended video, generate a text material corresponding to the target object based on key information in the recommended video.

In a third aspect, the embodiments herein provide an electronic device comprising one or more processors and a storage storing one or more programs, the one or more programs, when executed by the one or more processors, causing the one or more processors to implement the method for obtaining text material as described in any of the first aspect.

In a fourth aspect, the embodiments herein provide a computer-readable storage medium storing a computer program hereon. The program, when executed by a processor, implements the method for obtaining text material as described in any of the first aspect.

In a fifth aspect, the embodiments herein provide a computer program product. The computer program product comprises a computer program or instructions, when executed by a processor, implementing the method for obtaining text material as described in any of the first aspect.

The present disclosure provides a method, apparatus, apparatus, storage medium and program product for obtaining text material, comprising: in response to a material obtaining instruction for a target object, obtaining a set of candidate videos associated with the target object, the set of candidate videos comprising a plurality of posted candidate videos, the candidate video being a video segment containing an explained object, the explained object being the target object, or the explained object belonging to a same category as the target object; for each of the candidate videos, determining a popularity of the candidate video based on playing data of the candidate video and/or object information of the explained object contained in the candidate video; selecting, based on the popularities, a candidate video meeting a predetermined requirement as a recommended video and displaying the recommended video; and in response to a selection operation for the recommended video, generating a text material corresponding to the target object based on key information in the recommended video. The embodiments herein first obtain a video set associated with the target object, then selects a better recommended video based on the video playing data and the object information of the explained objects in the video, and finally obtains the text material of the target object from the selected recommended videos. In this way, the users can quickly obtain creative inspiration from the recommend videos.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, like or similar reference numerals denote like or similar elements. It should be understood that the drawings are illustrative and that the original and elements are not necessarily drawn to scale.

FIG. 1 is a schematic diagram of a scene for obtaining text material according to embodiment of the present disclosure;

FIG. 2 is a flowchart of a method for obtaining text material according to embodiments of the present disclosure;

DETAILED DESCRIPTION

Figure 3:
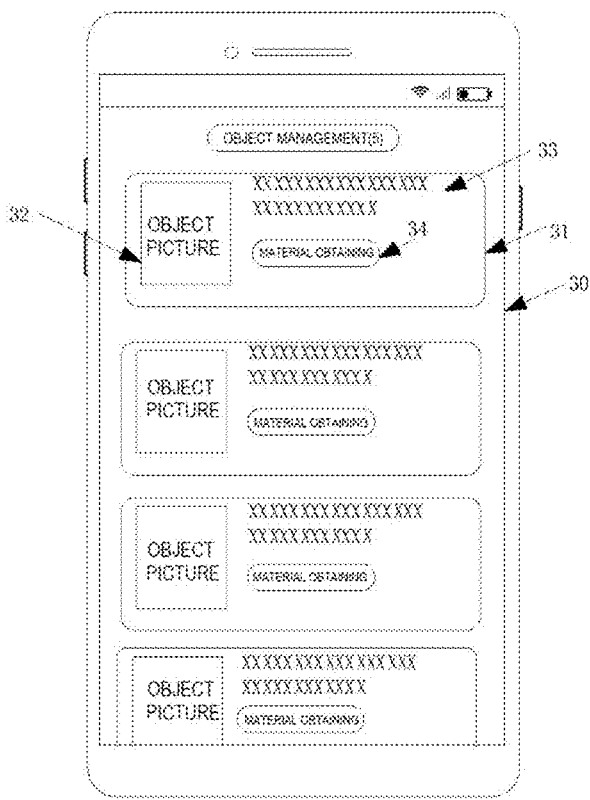
FIG. 3 is a schematic diagram of an object management page according to embodiments of the present disclosure.

The following embodiments of the present disclosure will be described in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of the present disclosure.

It should be understood that the various steps described in the method implementation method of this disclosure can be executed in different orders and/or in parallel. In addition, the method implementation method can include additional steps and/or omit the steps shown. The scope of this disclosure is not limited in this regard.

The term "including" and its variations used in this article are open-ended, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different devices, modules, or units, and are not used to limit the order or interdependence of the functions performed by these devices, modules, or units.

It should be noted that the modifications of "one" and "multiple" mentioned in this disclosure are illustrative and not restrictive. Those skilled in the art should understand that unless otherwise specified in the context, they should be understood as "one or more".

The names of the messages or information exchanged between multiple devices in this public implementation are for illustrative purposes only and are not intended to limit the scope of these messages or information.

Before further detailed description of the disclosed embodiments, the nouns and terms involved in the disclosed embodiments will be described, the nouns and terms involved in the disclosed embodiments apply to the following explanation.

In response to the conditions or states on which the operations performed depend, one or more operations performed can be real-time or have a set delay when the dependent conditions or states are met; without special instructions, there is no restriction on the execution order of multiple operations performed.

With the continuous development of Internet technology, short video technology has emerged and is increasingly favored by people. For example, people can post short videos by short video applications. The short video can be a video explaining the usage and advantages and disadvantages of an item, or a video explaining the viewing experience and shooting techniques of a film and television clip. By explaining an object through video, the audience can more intuitively understand more information about the object through video.

Currently, in the recording process of short videos, it is necessary to find image material and text material. Here the image material is mainly pictures or video segments about the explained object, and the text material is mainly text material about the detailed introduction of the explained object, such as the appearance introduction of an object, the opening text of the video, etc. In order to improve the recording quality of short videos, it is usually necessary to create a text material related to the explained object, which can be used to explain the explained object during the video recording process. The text material also includes video-related titles, topics, etc. However, how to create a text material that can attract the audience is a difficult problem for most video recorders.

In order to solve the above technical problems, the present disclosure provides a method for obtaining text material, the method comprising: in response to a material obtaining instruction for a target object, obtaining a set of candidate videos associated with the target object, the set of candidate videos comprising a plurality of posted candidate videos, the candidate video being a video segment containing an explained object, the explained object being the target object, or the explained object belonging to a same category as the target object; for each of the candidate videos, determining a popularity of the candidate video based on playing data of the candidate video and/or object information of the explained object contained in the candidate video; selecting, based on the popularities, a candidate video meeting a predetermined requirement as a recommended video and displaying the recommended video; and in response to a selection operation for the recommended video, generating a text material corresponding to the target object based on key information in the recommended video. The embodiments herein first obtain a video set associated with the target object, then selects a better recommended video based on the video playing data and the object information of the explained objects in the video, and finally obtains the text material of the target object from the selected recommended videos. In this way, the users can quickly obtain creative inspiration from the recommend videos.

The embodiments herein first obtain a video set associated with the target object, then selects a better recommended video based on the video playing data and the object information of the explained objects in the video, and finally obtains the text material of the target object from the selected recommended videos. In this way, the users can quickly obtain creative inspiration from the recommend videos.

Next, with reference to the accompanying drawings will be described in detail embodiments of the present disclosure. It should be noted that the same reference numerals in different figures will be used to refer to the same elements have been described.

FIG. 1 is a system in which the method for obtaining text material according to embodiments of the present disclosure can be embodied. As shown in FIG. 1, the system 100 may include a plurality of user terminals 110, network 120, server 130, and database 140. For example, the system 100 may be used to implement the method for obtaining text material according to any one embodiment of the present disclosure.

It will be appreciated that the user terminal 110 may be any other type of electronic device capable of performing data processing, which may include but are not limited to: mobile phones, sites, units, devices, multimedia computers, multimedia tablets, Internet nodes, communicators, desktop computers, laptop computers, notebook computers, netbook computers, tablet computers, personal communication system (PCS) devices, personal navigation devices, personal digital assistants (PDAs), audio/Mobile Pentium 4, digital cameras/camcorders, positioning devices, television receivers, radio broadcast receivers, e-book devices, gaming devices, or any combination thereof, including accessories and peripherals of these devices, or any combination thereof.

The user can operate through an application installed on the user terminal 110, the application 120 transmits user behavior data to the server 130 through the network, the user terminal 110 may also receive data transmitted by the server 130 through the network 120. The disclosed embodiment is not limited to the hardware system and software system of the user terminal 110. For example, the user terminal 110 may be based on ARM, X86 and other processors, and may have input/output devices such as cameras, touch screens, microphones, etc., and may run Windows, iOS, Linux, Android, HarmonyOS and other operating systems.

For example, the application on the user's terminal 110 can be a short video social application, such as a short video social application based on multimedia resources such as videos, pictures, and texts. Considering the short video social application based on multimedia resources such as videos, pictures and texts as an example, users can publish videos through the short video social application on the user's terminal 110 and can also watch or browse videos posted by other users and perform operations such as likes, comments, and forwarding.

The user terminal 110 may implement the method for obtaining text material provided in the present disclosure by running a process or thread. In some examples, the user terminal 110 may utilize its built-in application to perform the method for obtaining text material. In other examples, the user terminal 110 may perform the method for obtaining text material by calling an application stored externally by the user terminal 110.

Network 120 may be a single network, or a combination of at least two different networks. For example, network 120 may include, but is not limited to, a combination of one or more of local area networks, wide area networks, public networks, private networks, etc. Network 120 may be a computer network such as the Internet and/or various telecommunications networks (e.g., 3G/4G/5G mobile communication network, W IFI, Bluetooth, ZigBee, etc.), the embodiments herein is not limited thereto.

Server 130 may be a separate server, or a server group, or Cloud as a Service, the server group within each server is connected via a wired or wireless network. A server group may be centralized, such as a data center, may be distributed.

Server 130 may be local or remote. Server 130 may communicate with the user terminal 110 via a wired or wireless network.

Database 140 can refer to devices with storage functions. Database 140 is mainly used to store various data used, generated, and output by user terminal 110 and server 130 in their work, for example, taking the application program on user terminal 110 as the above-mentioned short video application program based on multimedia resources such as video, images, and audio, the data stored in database 140 can include resource data such as video and audio uploaded by users through user terminal 110, as well as interactive operation data such as likes, comments, and popularity.

Database 140 may be local or remote. Database 140 may include various memories, such as random access memory (Random Access Memory, RAM), read only memory (Read Only Memory, ROM) and the like. The above-mentioned storage devices are just some examples, and the storage devices that the system 100 can use are not limited thereto. The disclosed embodiments are not limited to the hardware and software systems of the database 140, and may be, for example, a relational database or a NoSQL database.

Database 140 can be interconnected or communicated with server 130 or a portion thereof via network 120, or directly with server 130, or a combination of the above two methods.

In some examples, the database 140 may be a standalone device, in other examples, the database 140 may also be integrated in at least one of the user terminal 110 and the server 130, for example, the database 140 may be provided on the user terminal 110 or on the server 130. as another example, the database 140 may be distributed, with a portion provided on the user terminal 110 and another portion provided on the server 130.

FIG. 2 is a flowchart of a method for obtaining text material according to embodiments herein, where the embodiments is applicable to obtain text material used when recording a video object. The method can be implemented by an apparatus for obtaining text material, and the apparatus can be implemented in software and/or hardware. The method for obtaining text material may be performed by the user terminal 110 in FIG. 1.

As shown in FIG. 2, the method for obtaining text material according to the present disclosure mainly comprises steps S101-S104.

S101, in response to a material obtaining instruction for a target object, obtain a set of candidate videos associated with the target object, the set of candidate videos comprising a plurality of posted candidate videos, the candidate video being a video segment containing an explained object, the explained object being the target object, or the explained object belonging to a same category as the target object.

In an alternative embodiment of the present disclosure, the target object is the main object of the user to record a video explanation. The target object may be one or more of a character, item, video segment, tourist attraction, physical store, online store, virtual task, etc., and the present disclosure is not limited in the regard. Optionally, in some embodiments, examples will be described where the target object is an article.

In an optional implementation of the present disclosure, the material obtaining instruction for the target object comprises: in response to an object management instruction, displaying an object management page, wherein the object management page comprises at least one or more objects to be managed, and each object to be managed is corresponding to a material obtaining control; and in response to a triggering operation for the material obtaining control, determining the object to be managed corresponding to the material obtaining control as the target object, and making a response to the material obtaining instruction for the target object.

In embodiments of the present disclosure, the object management instruction may be a user input instruction to open the object management page and make a response to the management function. The user terminal 110 detects a user trigger operation for the object management control and receives and responds to the object management instruction. The user terminal 110 detects the voice information input by the user, parses the voice information to obtain an object management instruction contained in the voice information, and makes a response to the object management instruction.

In the embodiments herein, the object management page may be an interactive interface provided by a short video application or software on the user terminal 110. The interactive interface may be used as a display interface for displaying a plurality of operable visual information to the user (i.e., the user terminal 110 of the user) and also for receiving a user operation performed in the interactive interface.

In the embodiments of the present disclosure, the above-described object management page displays a plurality of objects to be managed. When the number of objects to be managed exceeds a predetermined number, in response to a vertical sliding operation of the user on object management page, the plurality of objects to be managed are vertically moved for display.

The above-mentioned objects to be managed can be objects marked to be managed by users. For example, objects are added into an object management file. As shown in FIG. 3, the object management page 30 includes at least one or more object display areas 31. One object to be managed is corresponding to an object display area 31. The object display area 31 includes object image 32, object key information 33 and material obtaining control 34. Furthermore, if the object is an article, the selling price of the article is also included in the object display area 31. The object key information is information that introduces the attributes of the object, such as object name, taste, production process, and so on.

In one embodiment of the present disclosure, the user terminal 110 detects a user's trigger operation for the material obtaining control 34, determines the object to be managed that is associated with the material obtaining control as a target object, and responds to the material obtaining instruction for the target object.

In the present disclosure embodiment, by means of the above way for responding to the material obtaining instruction, the user can have a choice and intuitive selection of the target object, which is easy for the user to operate.

In one embodiment of the present disclosure, the candidate video set includes a plurality of candidate videos, which refer to videos published by users in the short video application which is publicly visible. The candidate video set associated with the target object can be understood in such a way that the explained object of the plurality of candidate videos included in the candidate video set is the target object, or the explained object of the candidate videos belongs to the same category as the target object. The explained object refers to the main object for which the video is explaining, describing or introducing. The explained object and the target object belong to the same category, meaning that they can be the same brand, same type, or same product category.

For example, the target object is "pickled chicken feet of brand A", and the explained object of the candidate video is "pickled chicken feet of brand A". That is, the candidate video explains and introduces "pickled chicken feet of brand A" as a topic. As another example, the target object is "pickled chicken feet of brand A", and the explained object of the candidate video is "pickled chicken feet of brand B". In this example, the candidate video explains and introduces "pickled chicken feet of brand B" as a topic, and the explained object of the candidate video can also be "pickled chicken feet of brand A" or other products of brand A.

S102, for each of the candidate videos, determine a popularity of the candidate video based on playing data of the candidate video and/or object information of the explained object contained in the candidate video.

The playing data of the candidate video can include the number of times the candidate video is played, the number of comments, the number of likes, the number of bullet comments, etc. The object information of the explained object can include the number of positive reviews, the number of orders, Per Customer Transaction, etc. Popularity can be understood as a numerical value that evaluates the popularity of a video which is determined based on the above playing data and/or object information according to the set rules, that is, the numerical value indicating the degree of attention paid to the video. A higher popularity indicates that more attention is paid to the video, and a lower popularity indicates that less attention is paid to the video.

Further, in the embodiments of the present disclosure, the playing data of the candidate video can be directly used as the popularity of the candidate video, and the object information of the explained object can also be used as the popularity of the candidate video. It is also possible to set weights for the playing data and the object information, respectively, and determine a value according to weighted averaging as the popularity of the candidate video. Scope of the present disclosure is not limited to the way for determining the popularity.

S103, select a candidate video meeting a predetermined requirement as a recommended video based on the popularity and displaying the recommended video.

The recommended video is recommended to the user by being displayed in a video recommendation page for the user to watch.

In one embodiment of the present disclosure, the candidate video(s) with the popularity greater than the popularity threshold is determined as the recommended video. For example, if the popularity threshold is set to 80, the candidate videos with the popularity higher than 80 are recommended videos.

In one embodiment of the present disclosure, select a candidate video meeting a predetermined requirement as a recommended video based on the popularity comprises: ranking the popularities in a descending order; and selecting candidate videos corresponding to a predetermined number of the popularities ranked on the top.

The predetermined number can be set according to the actual situation. Optionally, the predetermined number is 20. That is, the popularity corresponding to all the candidate videos is ranked in descending order, and the candidate videos corresponding to the top 20 popularities are determined as recommended videos.

In this way, the most popular video can be recommended to users to help the user's understanding of the current focus as well as audience's favorite hot topics at present, thereby inspiring the user's creativity.

In the present disclosure embodiment, displaying the recommended video comprises: displaying a plurality of recommended videos in form of information flow in a video recommendation page, and, in response to a vertical sliding operation on the video recommendation page, moving the plurality of recommended video for display.

In the embodiments of the present disclosure, the video recommendation page may be an interactive interface provided by a short video application or software on the user terminal 110. The interactive interface may be used as a display interface for showing a plurality of recommended videos to the user (i.e., the user terminal 110 users) and also for receiving a user's operation on the interactive interface.

In one embodiment of the present disclosure, as an example, the user terminal 110 can be a smartphone or tablet computer. In this example, the video recommendation page can occupy the entire display screen of the smartphone or tablet computer. In other words, the video recommendation page is the entire display interface of the smartphone or tablet computer. As another example, if the user terminal 110 is a laptop computer, the video recommendation page can occupy the entire display screen of the laptop computer or only a part of the display screen of the laptop computer.

In one embodiment of the present disclosure, displaying the recommended video comprises: displaying a plurality of recommended videos in form of information flow in a video recommendation page; and in response to a vertical sliding operation on the video recommendation page, moving the plurality of recommended video for display.

Figure 4:
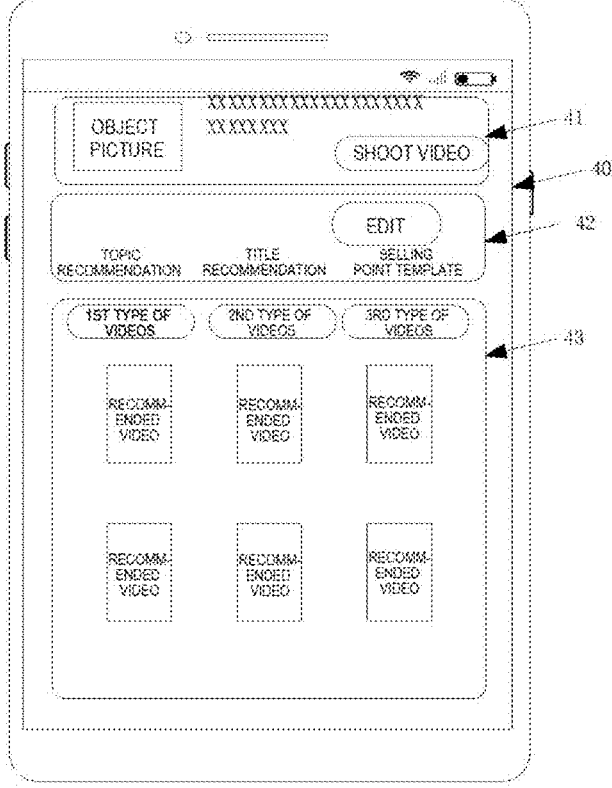
FIG. 4 is a schematic diagram of a video recommendation page according to embodiments of the present disclosure.

As shown in FIG. 4, the video recommendation page includes an object display area 41, the text material creation control 42 and video display area 43.

The object display area 41 is used to display key information of the target object, such as object picture, object attribute information, and video shooting control. The object attribute information includes object prices, object order numbers, etc. The video shooting control is used to, in response to a user's triggering operation, jump to the video prep page and record videos in the video prep page.

The text material creation control 42 is used to, in response to the user's triggering operation, jump to the text material editing page to allow the user to input text content in the text material editing page. Furthermore, the text material creation control 42 includes: guidance information for text material creation, such as topic recommendation identification, title recommendation identification, object selling point template, etc. Furthermore, if the user has already recorded and save text materials using the text material editing page, the text material creation control 42 also includes recent editing prompt information, which is a part of the saved text materials, e.g., the first 20 words of the saved text materials.

In embodiments of the present disclosure, the video display area 43 is used to display a plurality of recommended videos in the form of information (feed) streams. As shown in FIG. 4, the video display area 43 includes a plurality of sub-areas, each sub-area displaying a recommended video. In response to a user's vertical sliding operation on the video recommendation page, the recommended videos are moved for display. Further, in response to the upward sliding operation of the user, the text material creation control 42 in the video recommendation page disappears, and the text material creation control is interspersed in the video display area 43 in the form of a guide card. The style of the card can appear randomly, and a click will trigger entering into the text material editing page.

Furthermore, a video cover of the recommended video is displayed in the above sub-area. The video duration, video title, associated topics, and video introduction are displayed on the video cover. The above sub-area also includes information such as the order numbers corresponding to the explained object in the video.

In embodiments of the present disclosure, the video display area 43 further includes a first type of video control, a second type of video control, and a third type of video control. The first type of video control is used to, in response to a user's triggering operation, display the first type of videos in the video display area 43. The second type of video control is used to, in response to a user's triggering operation, display the second type of videos in the video display area 43. The third type of video control is used to, in response to a user's triggering operation, display the third type of videos in the video display area 43. The first type of videos are videos in which the explained object of the recommended video is a target object. The second type of videos are videos in which the explained object and the target object in the recommended video are of the same category. The third type of videos are a predetermined number of videos ranked on the top of a video list.

S104, in response to a selection operation for the recommended video, generate a text material corresponding to the target object based on key information in the recommended video.

The selection operation for the recommended video can be a trigger operation for the video that the user wants to watch. The key information of the recommended video includes the video title of the recommended video, the associated topic, and the text information converted from the audio information of the recommended video.

In embodiments of the present disclosure, the key information of the recommended video can be directly used as the text material corresponding to the target object.

In one embodiment of the present disclosure, the above key information can be edited based on the user's editing operation and used as text material corresponding to the target object.

In one embodiment of the present disclosure, in response to a selection operation for the recommended video, generating a text material corresponding to the target object based on key information in the recommended video comprises: in response to a triggering operation for the recommended video, obtaining detail information of the recommended video comprising at least one of: video information, audio information, video data, or anchor information; displaying a video detail page comprising a video playback area for playing the video information and displaying video data and/or anchor information on a playing screen; in response to an audio text conversion instruction, converting the audio information into text information; and generating the text material of the target object from the text information.

Figure 5:
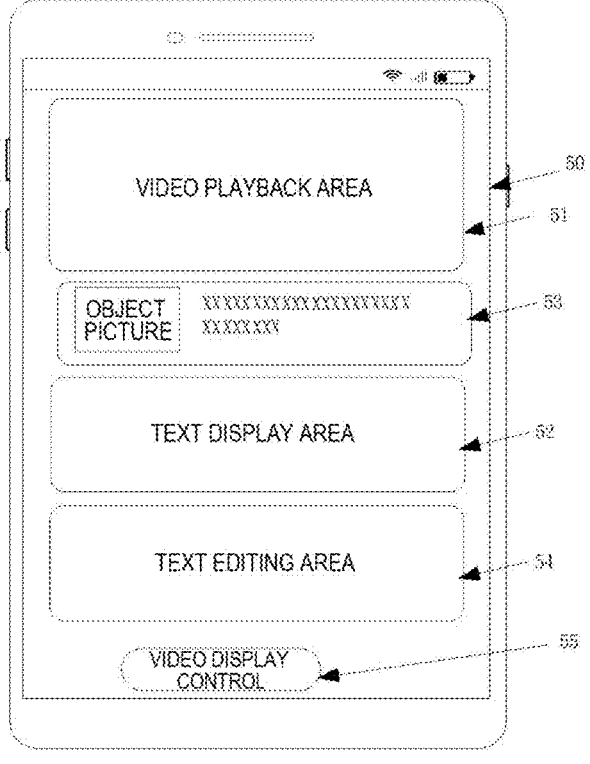
FIG. 5 is a schematic diagram of a video detail page according the embodiments of the present disclosure.

In embodiments of the present disclosure, as shown in FIG. 5, the video detail page is displayed in response to the user's selection operation for the recommended video. The video detail page 50 includes a video playback area 51. The video playback area 51 is used to play the video screen. In response to the user's click operation on the video playback area 51, the playback progress bar is displayed on the video screen, and in response to the left and right drag operation of the playback progress bar, the video can be fast-forwarded or rewound. In response to the operation on a control, the video playback can be paused. If the user has not clicked on the video playback area 51 or clicked for a predetermined duration, the video detail information is displayed at the bottom of the video screen. In response to the user's click operation on the video playback area 51, the detail information disappears, and the progress bar is displayed.

For example, video information, video data, anchor information, etc. are displayed at the bottom of the video screen. Video information can include video title, video topic, video release time, etc. In response to the user's click operation on the video topic, it jumps to the topic page on which various detail information under the topic is displayed. The anchor information includes the anchor avatar, anchor nickname, and in response to the trigger operation of the anchor information, it jumps to the anchor's personal homepage on which various information about the anchor is displayed, e.g., anchor avatar, anchor nickname, videos posted by the anchor, videos liked by the anchor, anchor watchlist, anchor fan list, etc. The video data includes video views, number of likes, number of comments, etc. The object information includes the order numbers and order quota of the object explained in the video.

In one embodiment of the present disclosure, the audio text conversion instruction can be understood as an instruction for converting audio information in a video into text information. Responding to the audio text conversion instruction may comprise: setting an audio text conversion control in the video detail page 50, detecting a trigger operation on the audio text conversion control, and responding to the audio text conversion instruction. Responding to the audio text conversion instruction may also comprise: after detecting the obtaining of detail information of the recommended video, automatically generating and responding to the audio text conversion instruction.

In one embodiment of the present disclosure, part or all of the converted text information is used as text material for the target object.

In one embodiment of the present disclosure, as shown in FIG. 5, the display video detail page 50 further includes a text display area 52. Generating the text material of the target object from the text information comprises: displaying the text information in the text display area; and in response to an operation in the text display area, duplicating a part or all of the text information as the key information in the recommended video, and generating the text material of the target object.

In embodiments of the present disclosure, when entering the video detail page, the converted text information is displayed in the text display area. If the video detail page has been displayed but the audio-to-text conversion is not completed, the conversion prompt information is displayed in the text display area. The conversion prompt information indicates to the user that the audio-to-text conversion is not completed and is in progress and please wait. After the conversion is completed, the text information is displayed directly in the text display area.

Further, the text display area with the audio text in the video is highlighted. In the embodiments herein, it is possible to highlight the audios that have already played. Or, the sentences of the audio which is being played are highlighted. It is also possible to high the words of the audio that is being played. In this way, the user can clearly watch the text corresponding to the audio currently being played.

In the embodiments of the present disclosure, in response to a click operation in the text display area 52, the text display area 52 is expanded, and in response to a vertical sliding operation on the text display area 52, the text in the text display area 52 is moved up and down for display. At the same time, the text is highlighted with the audio in the video.

In one embodiment of the present disclosure, if there is no voice information in the recommended video and the audio information is pure background music, no voice prompt information is displayed in the text display area 52, and the above-mentioned no voice prompt information is used to prompt the user that there is no oral endorsement voice content in the recommended video.

In one embodiment of the present disclosure, the text in the text display area 52 is rich text and supports operations such as long press selection, all selection, copy, and paste.

In one embodiment of the present disclosure, in response to a selection operation for the text information in the text display area 52, a part of all of the text information is selected. Then, a copy control is displayed in the text display area 52, and in response to a triggering operation for the copy control, the selected text information is determined as key information in the recommended video, and the text material of the target object is generated.

In one embodiment of the present disclosure, the video detail page 50 further includes an object information area 53 which is used to display relevant information of the object to the user, e.g., object picture, image title, object selling price, and so on.

In one embodiment of the present disclosure, when the above-mentioned recommended video is a second type of recommended video or a third type of recommended video, the object information area 53 also includes an object selection control. In response to a trigger operation for the above-mentioned object selection control, an object decision page is displayed. The object decision page is used to display a plurality of objects. In response to vertical sliding of the object decision page, the plurality of objects move up and down for display. In response to the selection operation for an object on the object decision page, the object corresponding to the selection operation is determined as the target object, and the object information of the target object is displayed in the object information area 53.

In one embodiment of the present disclosure, the video detail page 50 further comprises a text editing area 54 which is used to, in response to a user input operation, obtain the text information corresponding to the input operation for display. The input operation may be text information input by calling the virtual keyboard, or text information copied from the text display area and input to the text editing area 54 by a paste operation.

Furthermore, in response to the editing operation in the text editing area 54, the text information in the text editing area 54 can be edited. The editing operation includes text operations such as adding, deleting, copying, and pasting.

In the embodiments of the present disclosure, in response to the triggering operation of a text save control in the text editing area 54, the text information in the text editing area 54 is saved as the text material corresponding to the target object.

In one embodiment of the present disclosure, the video detail page 50 further includes: a video display control 55. The video display control 55 is used to display a plurality of recommended videos in response to a user's triggering operation. The recommended video belongs to the same category as the video played in the video detail page.

In one embodiment of the present disclosure, after obtaining the text material according to the method for obtaining text material provided in the above embodiment, the obtained text material is saved in the client to facilitate subsequent editing by the user. The obtained text material can also be saved locally in the form of an image to facilitate the user to view when recording a video.

On the basis of the above embodiments, embodiments of the present disclosure provide a way for determining a first type of video recommendation. Here the first type of video recommendation refers to the recommended videos where the explained object is the target object.

In the embodiments herein, all videos where the target object is the explained object are obtained. After deduplication processing of the videos, a set of candidate videos is obtained. Further, all of those videos are posted in a short video application, and the release times thereof are within a first predetermined duration. This predetermined duration can be set according to the actual situations, such as one month or two months. The order number of the explained object in the video is greater than a predetermined number which can be set according to the actual situation such as 20 or 50. The order number can be a monthly order number.

In one embodiment of the present disclosure, determining a popularity of the candidate video based on object information of the explained object contained in the candidate video comprises: determining object information corresponding to the explained object as the popularity of the candidate video.

Here the object information may be an order number or sales amount. That is, the order number or sales amount is used as the popularity of the candidate video. In this embodiment, considering an example where the popularity is the sales amount, the sales amounts are ranked in the descending order. The candidate videos corresponding to a predetermined number of sales amounts ranked on the top are determined as the recommended videos.

In embodiments of the present disclosure, it is determined whether the authors of the candidate videos are the same one. If the authors of a plurality of candidate videos are the same user, then one of the candidate videos are selected, according to a predetermined selection rule(s), as the candidate video for the subsequent ranking of popularities. Here the selection rules may comprise: the video with the highest order number, the video with the highest sales amount, or the video with the highest view number. In this way, the diversity of recommended videos can be ensured.

On the basis of the above embodiments, embodiments of the present disclosure provide a way for determining the second type of recommended video. Here the second type of recommended video refers to the video where the explained object and the target object are of the same category.

For the explained object in the candidate video belong to the same category as the target object, determining a popularity of the candidate video based on playing data of the candidate video and object information of the explained object contained in the candidate video comprises: obtaining a first weight corresponding to the playing data and a second weight corresponding to the object information; and obtaining the popularity of the candidate video by weighting the playing data, the first weight, the object information and the second weight.

In embodiments of the present disclosure, secondary category to which the target object belongs is determined, and all the videos with the objects in the secondary category as the explained object are obtained. It is determined whether the number of all videos reaches a predetermined number. If not, then the primary category to which the target object belongs is determined, and all the videos with the objects in the primary category as the explained object are obtained. Further, by deduplication processing of all the above videos, a set of candidate videos is obtained.

Further, all of the above videos are posted in a short video application. The release times are within a first predetermined duration. The predetermined duration can be set according to the actual situation, e.g., one month or two months. The order number of the explained object in a video is greater than the predetermined number which can be set according to the actual situations such as 20 or 50. The above order number can be the monthly order number. Alternatively, the sales amount of the explained object in a video is greater than the predetermined amount which can be set according to the actual setting such as 1,000. The video views or click number exceeds a predetermined playback number which can be set according to the actual situations such as 10,000.

In embodiments of the present disclosure, a weighting operation is performed according to the sales amount corresponding to the video views and the explained object in the video, to obtain the popularity of the candidate video. Here the weight values can be set according to the actual situations where the first weight corresponding to the playing data is smaller than the second weight corresponding to the object information.

In the embodiments herein, the candidate videos corresponding to a predetermined number of the popularities ranked on the top are determined as the recommended videos.

In the embodiments herein, it is determined whether the authors of the candidate videos are the same one. If so, one of the candidate videos is selected, according to a predetermined selection rule(s), as the candidate video for subsequent ranking of the popularities. Here, the selection rule may include: the video with the highest order number, the video with the highest sales amount, or the video with the highest view number. In this way, the diversity of recommended videos can be ensured.

On the basis of the above embodiments, the present disclosure provides a way for determining a third type of recommended video. Here the third type of recommended videos are the predetermined number of top videos in the video ranking list of a short video application. The predetermined number may be 20. Further, the third type of recommended video is a video that has been rated as a high-quality video. Scope of the present disclosure is not limited to the specific way for selecting high quality videos.

In embodiments of the present disclosure, various types of recommended videos are provided to help display different types of recommended videos to the user, so that the user can get creative inspiration from the recommended videos. Moreover, text material recording and editing areas are provided in the video detail page to help the user efficiently and accurately the record inspiration obtained from viewing the videos, thereby assisting the user in creating based on text material.

Figure 6:
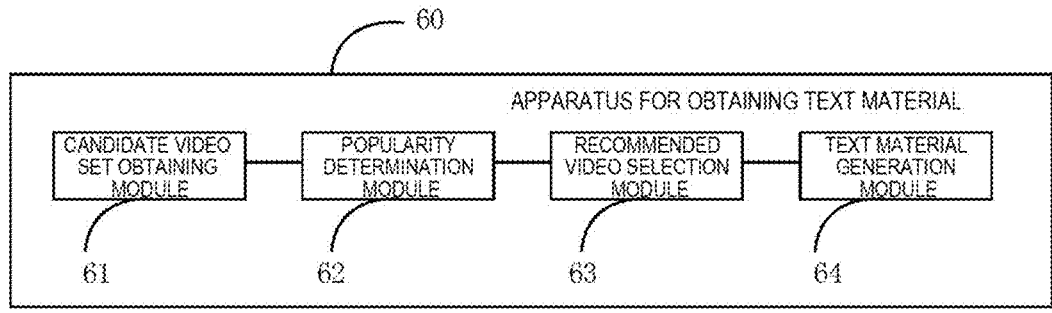
FIG. 6 is a schematic diagram of the structure of an apparatus for obtaining text material according to embodiments of the present disclosure.

FIG. 6 is a schematic diagram of an apparatus for obtaining text material according to embodiments of the present disclosure. The embodiments herein are applicable to the case of obtaining text material used when recording a video object. The apparatus for obtaining text material can be implemented in software and/or hardware and can be configured in the user terminal 110 in FIG. 1.

As shown in FIG. 6, the present disclosure provides an apparatus for obtaining text material comprising: a candidate video set obtaining module 61, a popularity determination module 62, a recommended video selection module 63 and a text material generation module 64.

The candidate video set obtaining module 61 is configured to, in response to a material obtaining instruction for a target object, obtain a set of candidate videos associated with the target object, the set of candidate videos comprising a plurality of posted candidate videos, the candidate video being a video segment containing an explained object, the explained object being the target object, or the explained object belonging to a same category as the target object. The popularity determination module 62 is configured to, for each of the candidate videos, determine a popularity of the candidate video based on playing data of the candidate video and/or object information of the explained object contained in the candidate video. The recommended video selection module 63 is configured to select, based on the popularity, a candidate video meeting a predetermined requirement as a recommended video and displaying the recommended video. The text material generation module 64 is configured to, in response to a selection operation for the recommended video, generate a text material corresponding to the target object based on key information in the recommended video.

In one embodiment of the present disclosure, the apparatus further comprises: an object management page display module configured to, in response to an object management instruction, display an object management page, wherein the object management page comprises at least one or more objects to be managed, and each object to be managed is corresponding to a material obtaining control; a material obtaining instruction response module configured to, in response to a triggering operation for the material obtaining control, determine the object to be managed corresponding to the material obtaining control as the target object, and respond to the material obtaining instruction for the target object.

In one embodiment of the present disclosure, the popularity determination module 62 is specifically configured to determine the object information corresponding to the explained object as the popularity of the candidate video.

In one embodiment of the present disclosure, the popularity determination module 62 comprises: a weight determination unit configured to obtain a first weight corresponding to the playing data and a second weight corresponding to the object information; and a popularity determination unit configured to obtain the popularity of the candidate video by weighting the playing data, the first weight, the object information and the second weight.

In one embodiment of the present disclosure, the recommended video selection module 63 includes: a ranking unit configured to rank the popularities in a descending order; and a recommended video determination unit configured to select candidate videos corresponding to a predetermined number of the popularities ranked on top.

In one embodiment of the present disclosure, the recommended video selection module 63 is specifically configured to, if a plurality of candidate videos are from a same publisher, select a candidate video with a highest popularity as the recommended video.

In one embodiment of the present disclosure, the apparatus comprises a recommended video display module configured to display the recommended video, comprising: a recommended video display unit configured to display a plurality of recommended videos in form of information flow in a video recommendation page; a recommended video moving unit configured to, in response to a vertical sliding operation on the video recommendation page, move the plurality of recommended video for display.

In one embodiment of the present disclosure, the text material generation module 64 comprises: a detail information obtaining unit configured to, in response to a triggering operation for the recommended video, obtain detail information of the recommended video comprising at least one of: video information, audio information, video data, or anchor information; a video detail page display unit configured to display a video detail page comprising a video playback area for playing the video information and displaying video data and/or anchor information on a playing screen; an audio conversion unit configured to, in response to an audio text conversion instruction, convert the audio information into text information; a text material generation unit configured to generate the text material of the target object from the text information.

In one embodiment of the present disclosure, the display video detail page further comprises a text display area; the text material generation unit is specifically configured to display the text information in the text display area; and in response to an operation in the text display area, duplicate a part or all of the text information as the key information in the recommended video, and generate the text material of the target object.

The apparatus for obtaining text material as provided herein can perform the steps of the method for obtaining text material according to embodiments of the present disclosure, and the execution and beneficial effects of the steps will not be repeated here.

Figure 7:
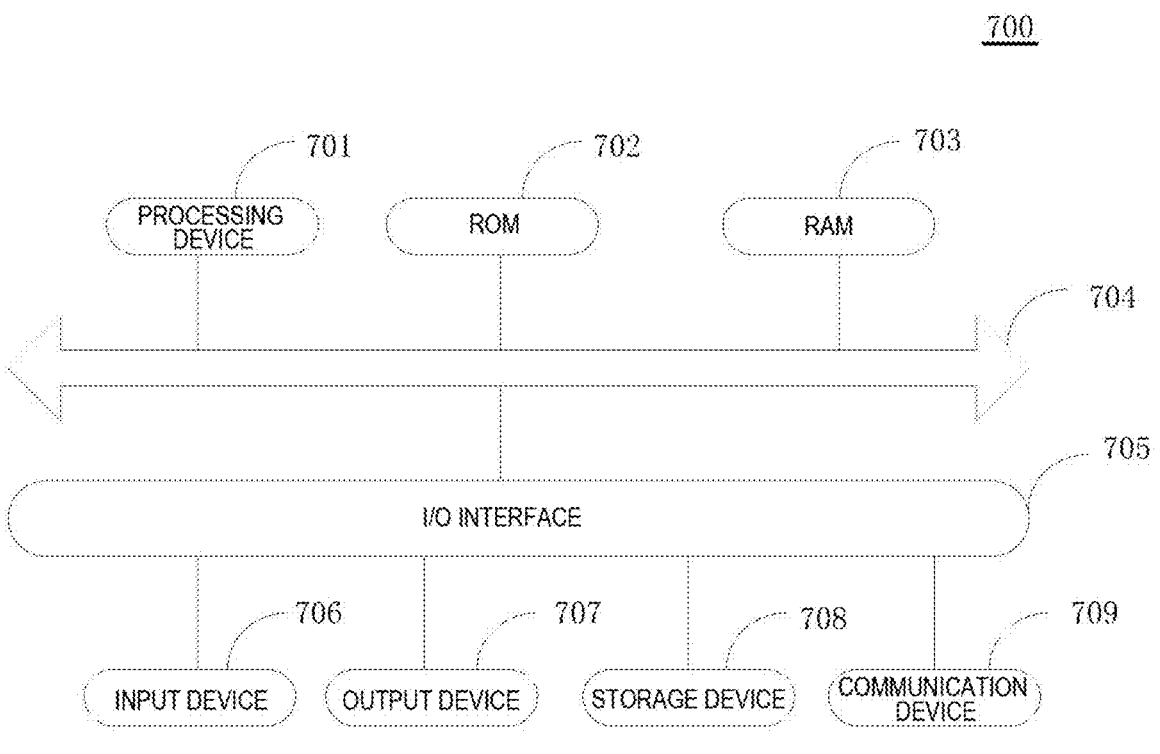
FIG. 7 is a schematic structural diagram of an electronic device according to embodiments of the present disclosure.

FIG. 7 is a schematic structural diagram of an electronic device in the disclosed embodiment. Referring specifically to FIG. 7 below, it shows a schematic structural diagram suitable for implementing the electronic device 700 in the disclosed embodiment. The electronic device 700 in the disclosed embodiment may include but is not limited to mobile terminals such as mobile phones, laptops, digital broadcast receivers, PDAs (personal digital assistants), PAD (tablet computers), PMPs (portable multimedia players), car terminals (such as car navigation terminals), wearable terminal devices, and fixed terminals such as digital TVs, desktop computers, smart home devices, etc. The electronic device shown in FIG. 7 is only an example and should not bring any limitations on the functionality and scope of use of the disclosed embodiment.

As shown in FIG. 7, the electronic device 700 may include a processing device (such as a Central Processor, graphics processing unit, etc.) 701, which can perform various appropriate actions and processes according to the program stored in the read-only memory (ROM) 702 or loaded from the storage device 708 into the random access memory (RAM) 703 to implement the method for obtaining text material according to embodiments of the present disclosure. In the RAM 703, various programs and data required for the operation of the terminal device 700 are also stored. The processing device 701, ROM 702, and RAM 703 are connected to each other through a bus 704. The input/output (I/O) interface 705 is also connected to the bus 704.

Typically, the following devices can be connected to the I/O interface 705: input devices 706, including touch screens, touchpads, keyboards, mice, cameras, microphones, accelerometers, gyroscopes, etc.; output devices 707, including liquid crystal displays (LCDs), speakers, vibrators, etc.; storage devices 708, including magnetic tapes, hard disks, etc.; and communication devices 709. Communication devices 709 can allow terminal devices 700 to communicate wirelessly or wirelessly with other devices to exchange data. Although FIG. 7 shows terminal devices 700 with various devices, it should be understood that it is not required to implement or have all of the devices shown. More or fewer devices can be implemented or provided instead.

In particular, according to embodiments of the present disclosure, the process described above with reference to the flowchart may be implemented as a computer software program. For example, embodiments of the present disclosure include a computer program product comprising a computer program carried on a non-transitory computer-readable medium, the computer program comprising program code for performing the method shown in the flowchart, thereby implementing the method for obtaining text material as described above. In such embodiments, the computer program can be downloaded and installed from the network through the communication device 709, or installed from the storage device 708, or installed from the ROM 702. When the computer program is executed by the processing device 701, the above-described functions defined in the method of the present disclosure are performed.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, RF (radio frequency), etc., or any suitable combination thereof.

In some embodiments, the client and server may communicate using any currently known or future developed network protocol such as HTTP (HyperText Transfer Protocol), and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone without being assembled into the electronic device.

The computer-readable medium carries one or more programs, and when the one or more programs are executed by the terminal device, the terminal device: responds to the material obtaining instruction for the target object, obtains a set of candidate videos associated with the target object, the candidate video set includes multiple posted candidate videos, the candidate videos are video segments including explanatory objects, the explanatory objects are target objects, or the explanatory objects belong to the same category as the target objects; for each candidate video, the popularity of the candidate video is determined based on the playing data of the candidate video and/or the object information of the explanatory objects included in the candidate video; based on the popularity, the candidate videos that meet the predetermined requirements are selected as recommended videos and displayed; in response to the selection operation of the recommended video, text materials corresponding to the target object are generated based on key information in the recommended video.

Alternatively, when the one or more programs are executed by the terminal device, the terminal device may also perform other steps described above embodiments.

Computer program code for performing the operations of the present disclosure may be written in one or more programming languages, or combinations thereof, including but not limited to Object Oriented programming languages such as Java, Smalltalk, C++, and also including conventional procedural programming languages such as "C" language or similar programming languages. The program code may be executed entirely on the user's computer, partially on the user's computer, as a standalone software package, partially on the user's computer, or entirely on a remote computer or server. In the case of a remote computer, the remote computer may be connected to the user's computer through any type of network, including a local area network (LAN) or a wide area network (WAN), or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions marked in the blocks may also occur in a different order than those marked in the figures. For example, two blocks represented in succession may actually be executed substantially in parallel, and they may sometimes be executed in the opposite order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Described in the embodiments herein relates to the disclosed unit may be implemented by way of software, may be implemented by way of hardware, wherein the name of the unit does not constitute a limitation on the unit itself in some cases.

The functions described above herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, the present disclosure provides a method for obtaining text material, comprising: in response to a material obtaining instruction for a target object, obtaining a set of candidate videos associated with the target object, the set of candidate videos comprising a plurality of posted candidate videos, the candidate video being a video segment containing an explained object, the explained object being the target object, or the explained object belonging to a same category as the target object; for each of the candidate videos, determining a popularity of the candidate video based on playing data of the candidate video and/or object information of the explained object contained in the candidate video; selecting, based on the popularities, a candidate video meeting a predetermined requirement as a recommended video and displaying the recommended video; and in response to a selection operation for the recommended video, generating a text material corresponding to the target object based on key information in the recommended video.

According to one or more embodiments of the present disclosure, the present disclosure provides an apparatus for obtaining text material, comprising: a candidate video set obtaining module configured to, in response to a material obtaining instruction for a target object, obtain a set of candidate videos associated with the target object, the set of candidate videos comprising a plurality of posted candidate videos, the candidate video being a video segment containing an explained object, the explained object being the target object, or the explained object belonging to a same category as the target object; a popularity determination module configured to, for each of the candidate videos, determine a popularity of the candidate video based on playing data of the candidate video and/or object information of the explained object contained in the candidate video; a recommended video selection module configured to select, based on the popularity, a candidate video meeting a predetermined requirement as a recommended video and displaying the recommended video; and a text material generation module configured to, in response to a selection operation for the recommended video, generate a text material corresponding to the target object based on key information in the recommended video.

According to one or more embodiments of the present disclosure, the present disclosure provides an electronic device comprising one or more processors and a storage storing one or more programs, the one or more programs, when executed by the one or more processors, causing the one or more processors to implement the method for obtaining text material as described herein.

According to one or more embodiments of the present disclosure, the present disclosure provides a computer-readable storage medium storing a computer program hereon. The program, when executed by a processor, implements the method for obtaining text material as described herein.

The present disclosure further provides a computer program product. The computer program product comprises a computer program or instructions, when executed by a processor, implementing the method for obtaining text material as described herein.

The above description is only the preferred embodiment of the present disclosure and an explanation of the technical principles used. Those skilled in the art should understand that the scope of the disclosure involved in this disclosure is not limited to the specific combination of the technical features of the above technical solutions, but should also cover other technical solutions formed by any combination of the above technical features or equivalent features without departing from the above disclosure concept. For example, the technical solutions formed by replacing the above features with (but not limited to) technical features with similar functions disclosed in this disclosure.

In addition, although the operations are depicted in a specific order, this should not be understood as requiring these operations to be performed in the specific order shown or in sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the present title has been described in language specific to structural features and/or methodological logical acts, it should be understood that the titles defined in the appended claims are not necessarily limited to the particular features or acts described above. Rather, the particular features and acts described above are merely exemplary forms of implementation of the claims.

I claim:

1. A method for obtaining text material, comprising:
in response to a material obtaining instruction for a target object, obtaining a set of candidate videos associated with the target object, the set of candidate videos comprising a plurality of posted candidate videos, each candidate video being a video segment containing an explained object, the explained object being the target object or belonging to a same category as the target object;

for each of the candidate videos, determining a popularity of the candidate video based on playing data of the candidate video and/or object information of the explained object contained in the candidate video;

selecting, based on the popularities, a candidate video meeting a predetermined requirement as a recommended video and displaying the recommended video;

in response to a selection operation for the recommended video, obtaining detail information of the recommended video comprising streamer information and at least one of: video information, audio information, or video data, the streamer information comprising at least one of a streamer avatar or a streamer nickname, the video information comprising at least one of: a video title, a video topic, or video posting time;

displaying a video detail page comprising a video playback area for playing the video information and displaying the at least one of the video data and the streamer information on a playing screen;

in response to an audio text conversion instruction, converting the audio information into text information; and generating a text material corresponding to the target object from the text information.

2. The method of claim 1, further comprising:

in response to an object management instruction, displaying an object management page, wherein the object management page comprises at least one or more objects to be managed, and each object to be managed is corresponding to a material obtaining control; and in response to a triggering operation for the material obtaining control, determining the object to be managed corresponding to the material obtaining control as the target object, and responding to the material obtaining instruction for the target object.

3. The method of claim 1, wherein the explained object contained in each candidate video is the target object, and determining the popularity of the candidate video based on the object information of the explained object contained in the candidate video comprises:

determining the object information corresponding to the explained object as the popularity of the candidate video.

4. The method of claim 1, wherein for each candidate video containing the explained object belonging to the same category as the target object, determining the popularity of the candidate video based on the playing data of the candidate video and the object information of the explained object contained in the candidate video comprises:

obtaining a first weight corresponding to the playing data and a second weight corresponding to the object information; and obtaining the popularity of the candidate video by weighting the playing data, the first weight, the object information and the second weight.

5. The method of claim 1, wherein the selecting, based on the popularities, the candidate video meeting the predetermined requirement as the recommended video comprises:

ranking the popularities in a descending order; and selecting candidate videos corresponding to a predetermined number of the popularities ranked on top.

6. The method of claim 1, wherein the selecting, based on the popularities, the candidate video meeting the predetermined requirement as the recommended video comprises:

if a plurality of candidate videos are from a same publisher, selecting the candidate video with a highest popularity as the recommended video.

7. The method of claim 1, wherein the displaying the recommended video comprises:

displaying a plurality of recommended videos in form of information flow in a video recommendation page; and in response to a vertical sliding operation on the video recommendation page, moving the plurality of recommended video for display.

8. The method of claim 1, wherein the video detail page further comprises a text display area, and generating the text material corresponding to the target object from the text information comprises:

displaying the text information in the text display area; and in response to an operation in the text display area, duplicating a part or all of the text information as key information in the recommended video, and generating the text material of the target object.

9. The method of claim 2, further comprising:

detecting voice information input by a user, parsing the voice information to obtain the object management instruction contained in the voice information.

10. The method of claim 2, wherein the object management page displays a plurality of objects to be managed, and the method further comprises:

if a number of the plurality of objects to be managed exceeds a predetermined number, in response to a user's vertical sliding operation on the object management page, vertically moving the plurality of objects to be managed for display.

11. An electronic device comprising:

one or more processors; and a storage storing one or more programs, the one or more programs, when executed by the one or more processors, causing the one or more processors to perform acts comprising:

in response to a material obtaining instruction for a target object, obtaining a set of candidate videos associated with the target object, the set of candidate videos comprising a plurality of posted candidate videos, each candidate video being a video segment containing an explained object, the explained object being the target object or belonging to a same category as the target object;

for each of the candidate videos, determining a popularity of the candidate video based on playing data of the candidate video and/or object information of the explained object contained in the candidate video;

selecting, based on the popularities, a candidate video meeting a predetermined requirement as a recommended video and displaying the recommended video;

in response to a selection operation for the recommended video, obtaining detail information of the recommended video comprising streamer information and at least one of: video information, audio information, or video data, the streamer information comprising at least one of a streamer avatar or a streamer nickname, the video information comprising at least one of: a video title, a video topic, or video posting time;

displaying a video detail page comprising a video playback area for playing the video information and displaying the at least one of the video data and the streamer information on a playing screen;

in response to an audio text conversion instruction, converting the audio information into text information; and generating a text material corresponding to the target object from the text information.

12. The electronic device of claim 11, the acts further comprising:

in response to an object management instruction, displaying an object management page, wherein the object management page comprises at least one or more objects to be managed, and each object to be managed is corresponding to a material obtaining control; and in response to a triggering operation for the material obtaining control, determining the object to be managed corresponding to the material obtaining control as the target object, and responding to the material obtaining instruction for the target object.

13. The electronic device of claim 11, wherein the explained object contained in each candidate video is the target object, and determining the popularity of the candidate video based on the object information of the explained object contained in the candidate video comprises:

determining the object information corresponding to the explained object as the popularity of the candidate video.

14. The electronic device of claim 11, wherein for each candidate video containing the explained object belonging to the same category as the target object, determining the popularity of the candidate video based on the playing data of the candidate video and the object information of the explained object contained in the candidate video comprises:

obtaining a first weight corresponding to the playing data and a second weight corresponding to the object information; and obtaining the popularity of the candidate video by weighting the playing data, the first weight, the object information and the second weight.

15. The electronic device of claim 11, wherein the selecting, based on the popularities, the candidate video meeting the predetermined requirement as the recommended video comprises:

ranking the popularities in a descending order; and selecting candidate videos corresponding to a predetermined number of the popularities ranked on top.

16. The electronic device of claim 11, wherein the selecting, based on the popularities, the candidate video meeting the predetermined requirement as the recommended video comprises:

if a plurality of candidate videos are from a same publisher, selecting the candidate video with a highest popularity as the recommended video.

17. The electronic device of claim 11, wherein the displaying the recommended video comprises:

displaying a plurality of recommended videos in form of information flow in a video recommendation page; and in response to a vertical sliding operation on the video recommendation page, moving the plurality of recommended video for display.

18. A non-transitory computer-readable storage medium storing a computer program thereon, the computer program, when executed by a processor, implementing a method for obtaining text material, comprising:

in response to a material obtaining instruction for a target object, obtaining a set of candidate videos associated with the target object, the set of candidate videos comprising a plurality of posted candidate videos, each candidate video being a video segment containing an explained object, the explained object being the target object or belonging to a same category as the target object;

for each of the candidate videos, determining a popularity of the candidate video based on playing data of the candidate video and/or object information of the explained object contained in the candidate video;

selecting, based on the popularities, a candidate video meeting a predetermined requirement as a recommended video and displaying the recommended video;

in response to a selection operation for the recommended video, obtaining detail information of the recommended video comprising streamer information and at least one of: video information, audio information, or video data, the streamer information comprising at least one of a streamer avatar or a streamer nickname, the video information comprising at least one of: a video title, a video topic, or video posting time;

displaying a video detail page comprising a video playback area for playing the video information and displaying the at least one of the video data and the streamer information on a playing screen;

in response to an audio text conversion instruction, converting the audio information into text information; and generating a text material from the text information.

\* \* \* \* \*